(12) United States Patent
Hillemann

(10) Patent No.: US 6,322,179 B1
(45) Date of Patent: Nov. 27, 2001

(54) ORIENTATION ADJUSTABLE INSULATED WORKPIECE FOR WELDING

(76) Inventor: Kurt D. Hillemann, P.O. Box 1453, Newport, WA (US) 99156

( * ) Notice: Subject to any disclaimer, the term of this patent is extended or adjusted under 35 U.S.C. 154(b) by 0 days.

(21) Appl. No.: 09/368,955

(22) Filed: Aug. 5, 1999

(51) Int. Cl.$^7$ ................................................. A47B 96/04
(52) U.S. Cl. ................................... 312/409; 312/292
(58) Field of Search ................................ 312/400, 409, 312/410, 236, 352, 291, 292, 402, 405; 432/225, 226; 248/285.1

(56) References Cited

U.S. PATENT DOCUMENTS

| | | | |
|---|---|---|---|
| 412,187 | 10/1889 | Jeffrey | 432/226 |
| 976,067 | * 11/1910 | Gilmore | 312/409 |
| 1,443,082 | 1/1923 | Mauck | 228/199 |
| 1,805,181 | 5/1931 | Miller | 432/225 |
| 2,002,877 | 5/1935 | Barrington | 228/218 |
| 2,123,612 | 7/1938 | Obert | 432/225 |
| 2,561,125 | * 7/1951 | Leibowitz | 312/292 X |
| 3,491,226 | 1/1970 | Beadle | 219/121.14 |
| 4,079,604 | * 3/1978 | Anderegg | 248/285.1 X |
| 5,312,182 | * 5/1994 | Mlakar et al. | 312/409 |
| 5,413,410 | * 5/1995 | Mlakar | 312/409 |
| 6,058,523 | * 5/2000 | Sleboda | 312/405 X |

* cited by examiner

Primary Examiner—James O. Hansen
(74) Attorney, Agent, or Firm—David S. Thompson

(57) ABSTRACT

An adjustable support carries a workpiece in a manner that allows convenient welding. An enclosure having opposed half-round ends and a rounded half cylinder body defines an insulated workpiece cavity. The enclosure supports a hinged cover having a frame within which slides first and second sliding doors which allow an opening of variable size and location to be formed for access to the workpiece cavity. A frame provides a base from which extend left and right forks which are pivotally attached to opposed middle portions of the enclosure. A locking pivot allows the angle between the forks and the enclosure to be adjusted and fixed as desired. A support insert, extending from the base of the frame, may be attached to a support mounted in a work area, heating area or cooling area. A locking pivot allows the angle between the support insert and the enclosure to be adjusted and fixed as desired. A restraint assembly, carried within the enclosure, provides one or more arms which may be adjusted to hold the workpiece in place.

8 Claims, 5 Drawing Sheets

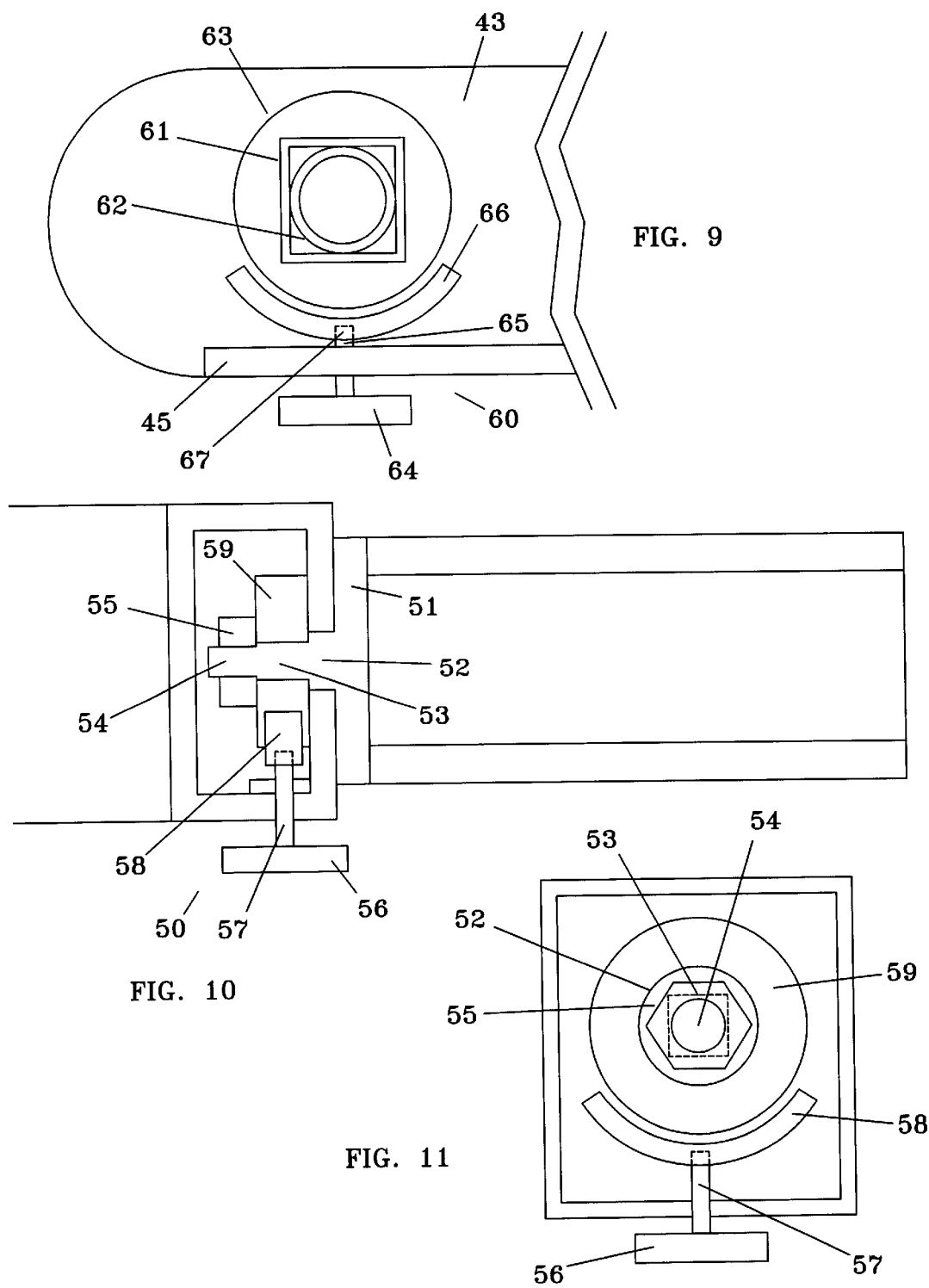

ORIENTATION ADJUSTABLE INSULATED WORKPIECE FOR WELDING

CROSS-REFERENCES

There are no applications related to this application filed in this or any foreign country.

BACKGROUND

Workpieces that need to be preheated before welding, such as cast iron, are heated to very high temperatures in an appropriate oven. After preheating, the workpiece might be welded through the oven door. This method maintains the heat of the workpiece, but results in an overly hot work environment and inconvenient access to the workpiece, which will necessitate cumbersome heat resistant gear to be worn by the workers.

Alternatively, the workpiece might be removed from the oven and placed on a steel or brick surface. In this circumstance the workpiece is more accessible, but work must be done quickly, before the workpiece cools below the temperature at which quality work may be done.

A still further alternative is to use insulating blankets to maintain the workpiece at the desired temperature. However, such blankets tend to wear at a rapid rate, resulting in excessive cost.

And as a still further alternative, other methods such as a firebrick enclosure may be used. However, such alternatives also fail both to provide a cool workplace and to provide the time required to work prior to cooling of the workpiece.

In some circumstances, additional heat may be applied to the workpiece, apart from the heat of the welding torch. While such supplemental heat may allow a greater period during which the workpiece may be available, the heat tends to result in an overly hot workplace which also tends to limit the duration of actual work.

Unfortunately, none of the above alternatives is completely satisfactory. Where the workpiece is cool enough to be easily approachable, the welding torch might not be able to maintain enough heat and welding quality is compromised. Where the welding torch is able to keep a portion of the workpiece warm, but other portions cool, warping and cracking may result. Similarly, if the part is allowed to cool too quickly, warping and cracking may also result.

Additional problems result when the welder needs to reposition a workpiece, such as a large engine block, during the course of work. Repositioning the workpiece can require several people in some circumstances, due to the heat radiated by the workpiece and due to its mass. Time spent in repositioning the work piece results in a reduction in the time during which welding may be performed.

As a result of the above problems, what is needed is a holder for a workpiece that is fully insulated and which therefore is able to prolong the time during which a welder may work. The structure of the holder should also be adapted to allow rotation about an axis in each of two perpendicularly oriented directions. The structure of the holder should also result in an opening through which work may be done that is adjustable in both size and location. The structure of the holder should also include a restraint assembly to prevent undesired movement of the workpiece within the holder.

SUMMARY

The present invention is directed to an apparatus that satisfies the above needs. A novel workpiece support for welding provides an insulated enclosure within which a workpiece may be carried. The enclosure provides some or all of the following structures.

(A) A preferred enclosure provides half-round end pieces at opposed ends of a semi-cylindrical rounded body. Ceramic insulation prevents rapid heat transfer, and is sandwiched between metal inside and outside metal surfaces.

(B) A cover is carried by the enclosure by hinges oriented along the length of the enclosure between the half-round ends. The cover provides a frame carrying independently movable first and second sliding doors. With both doors fully slid within the frame, the cover fully covers the workpiece carried within the enclosure. With one or both doors partially slid from the frame an opening is formed allowing access to the workpiece to be welded.

(C) A frame, having left and right forks extending from a base, supports the enclosure at the middle points of opposite sides of the rounded body. A support insert, extending from the base, is attachable to a receiver which may be located on an oven, a cooling area or a rolling cart.

(D) A locking pivot allows the enclosure to be pivoted with respect to the frame in a manner that allows one half round end to be raised and the other lowered, as desired, and then locked into place.

(E) A locking pivot, carried between the support insert and the frame base, allows the enclosure to be pivoted in a manner that lowers one of the frame forks while raising the other, thereby allowing adjustment of the angle at which the workpiece may be accessed and to control the pooling of metal in a manner that does not promote unintended run-off.

(F) A restraint assembly provides at least one restraint, carried by the enclosure, for use in holding the workpiece in place within the enclosure. A preferred restraint assembly includes opposed first and second tracks, defined on an inside surface of the enclosure. A sliding base support and a sliding latch support slide in the first and second tracks, respectively. An arm carried by the sliding base support is releasably attachable to the sliding latch support, allowing the arm to be latched against the workpiece to prevent its movement.

It is therefore a primary advantage of the present invention to provide a novel insulated workpiece support which prevents rapid heat transfer from the workpiece, thereby extending the period of time during which work may be performed and also reducing the heat exposure to the worker.

Another advantage of the present invention is to provide a novel insulated workpiece support which provides a structure allowing the worker to adjust the size and location of the opening through which work is performed.

A still further advantage of the present invention is to provide a novel insulated workpiece support which allows rotation about at least one axis of the enclosure supporting the workpiece to increase the ability of the welder to control the pooling of melted metal and to access certain parts of the workpiece.

DRAWINGS

These and other features, aspects, and advantages of the present invention will become better understood with regard to the following description, appended claims, and accompanying drawings where:

FIG. 9 is an enlarged view of the locking pivot controlling the rotation demonstrated by FIGS. 3 and 4.

FIG. 10 is an enlarged view of the locking pivot controlling the rotation demonstrated by FIGS. 7 and 8.

FIG. 11 is a cross-sectional view of the locking pivot of FIG. 10.

DESCRIPTION

Figure 1:
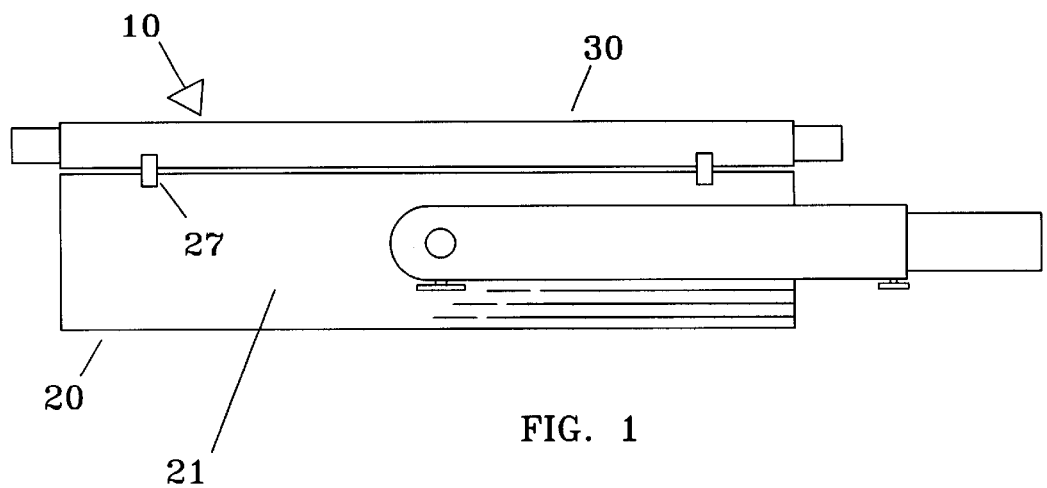
FIG. 1 is a side orthographic view of a version of the adjustable insulated workpiece support for welding.

Referring generally to FIGS. 1 through 10, an adjustable support 10 constructed in accordance with the principles of the invention is seen. The adjustable support carries a workpiece in a manner that allows convenient welding. A preferred version of the adjustable support provides an enclosure 20 having opposed half-round ends and a rounded half cylinder body defining an insulated workpiece cavity. The enclosure supports a hinged cover 30 having a frame within which slide first and second sliding doors which allow an opening of variable size and location to be formed for access to the workpiece cavity. A frame 40 provides a base from which extend left and right forks which are pivotally attached to opposed middle portions of the enclosure. A locking pivot 60 allows the angle between the forks and the enclosure to be adjusted and fixed as desired. A support insert, extending from the base of the frame, may be attached to a support mounted in a work area, heating area or cooling area or mobile cart. A locking pivot 50 allows the angle between the support insert and the enclosure to be adjusted and fixed as desired. A restraint assembly 90, carried within the enclosure 20, provides one or more arms which may be adjusted to hold the workpiece in place without blocking access.

As seen in FIGS. 1 through 8, an enclosure 20 provides an insulated rounded body 21 which defines a workpiece cavity 28 sized to accept a workpiece to be welded. A preferred version of the enclosure is approximately 32 inches long by 12 inches wide and 12 inches deep, a size which accommodates most automotive cylinder heads. Alternatively, other dimensions and shapes may by used to result in an alternately sized enclosure. Opposed half-round front and rear end pieces 22, 23 are carried at either end of the rounded body 21.

A preferred version of the half-round end pieces 22, 23 and the rounded body 21 are made of inner and outer metal siding surfaces 24, 25 having ceramic or similar heat damage resistant insulation 26 sandwiched between. The metal provides durability, but high heat conductivity. The ceramic insulation provides low thermal conductivity.

As seen in FIGS. 1 through 8, a cover 30 is attached by a hinge 38 along a first elongated side to the enclosure 20 and secured by a latch 29. The cover may be opened to allow access to the workpiece cavity 28, particularly for placement and removal of the workpiece. When the cover is fully closed, as seen in FIG. 1, fasteners 27 may be used to lock it in place. An insulating strip 39 may be provided to reduce heat flow out of the workpiece cavity when the cover is closed. The insulating strip is constructed so that no heat can be conducted from the inside to the outside by conduction through metal parts.

As is best seen in FIGS. 5 through 8 a preferred cover provides a frame 31 which defines an elongated top opening 33 providing access to the workpiece cavity. U-shaped side elements 32 are oriented with the open portions of the "U" facing each other, thereby forming a track within which at least one sliding doors may travel.

In a preferred embodiment, two sliding doors 35, 36 are made of a rigid insulating material which tends to block both radiant heat transfer and conductive heat transfer. The sliding doors may be made of ceramic having a metal covering or materials that are similarly rugged and insulating. In the preferred embodiment, the sliding doors are the same size; however, alteration of their relative size may be made, to allow the location of the opening 37 to be more accurately selected.

Figure 2:
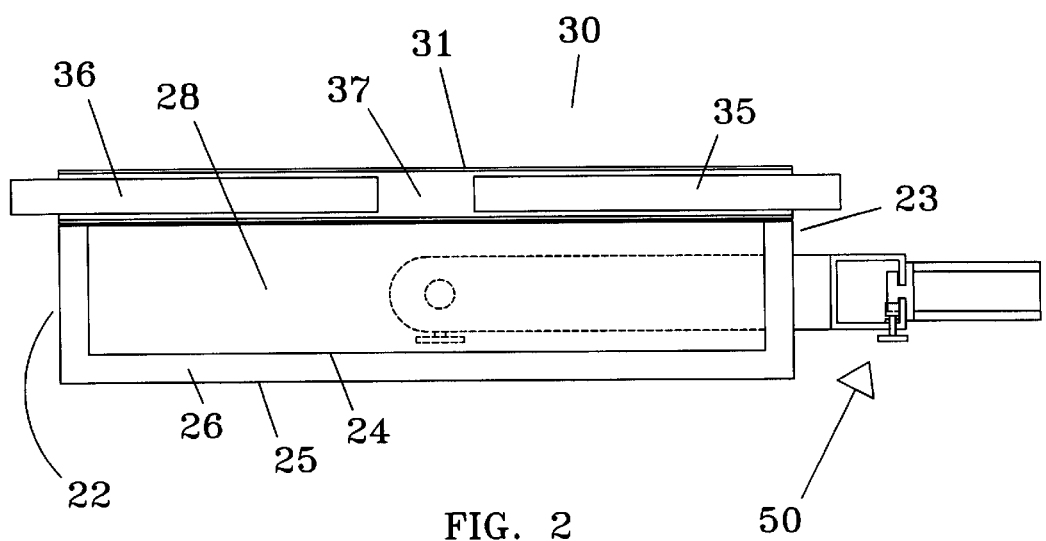
FIG. 2 is a side cross-sectional view of the support of FIG. 1.
Figure 5:
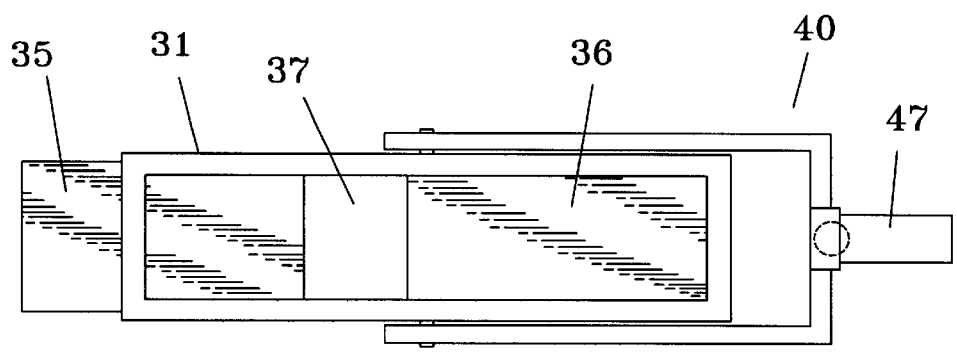
FIG. 5 is a top orthographic view illustrating how the operation of the first and second sliding doors carried by the cover can result in an opening slightly forward of the ends of the forks.
Figure 6:
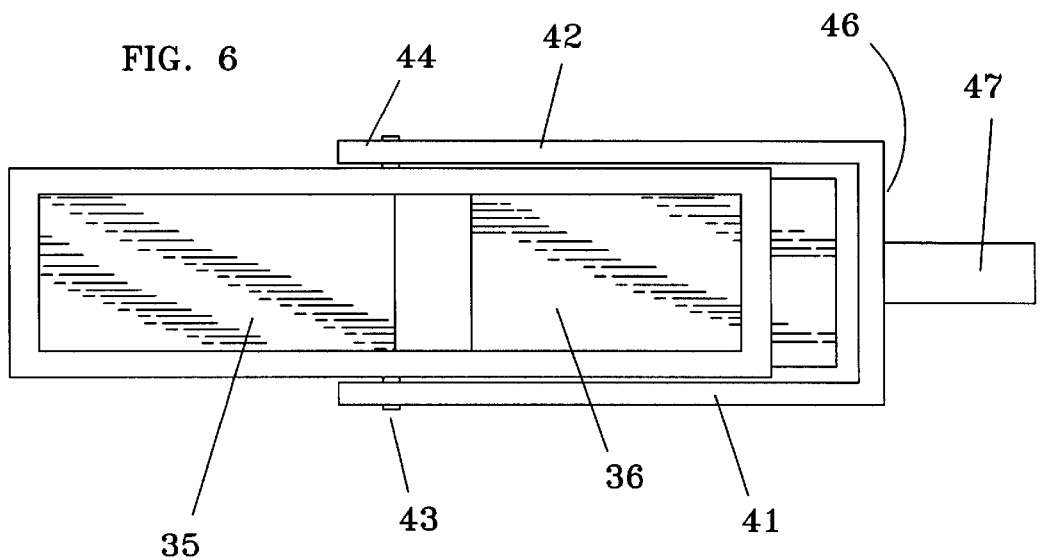
FIG. 6 is a top orthographic view similar to FIG. 5, illustrating how the location of the opening in the cover can be further adjusted for size and location.

As seen by comparison of FIGS. 2, 5 and 6, the first and second sliding doors may be opened by manually sliding them out of the opposed end openings 34 in the frame. The degree to which the sliding doors are opened results in an opening 37 between the doors that may be sized and positioned to result in the appropriate and required access to the workpiece cavity 28.

In an alternative embodiment, only one sliding door made of a rigid insulating material may be used in place of the two sliding doors. By moving the single sliding door, an opening in the cover could be formed in a manner similar to that described above.

As seen in FIGS. 1 through 6, a frame 40 carries the enclosure 20 in an adjustable manner which allows rotation about two perpendicular axes. The rotation allows for adjustment of the angle of the workpiece carried within the workpiece cavity. This allows the welder to control the angle of the pooling of the molten metal in a manner that prevents unintended run-off and also results in more convenient welding.

Figure 3:
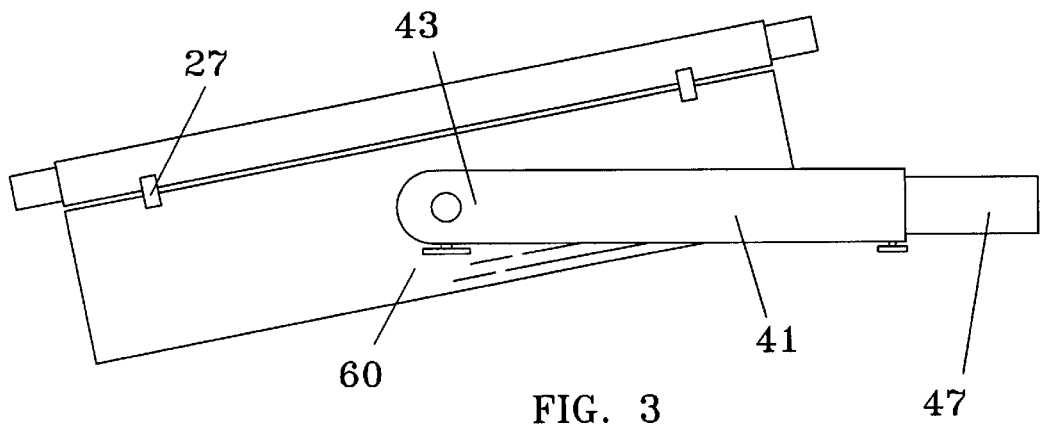
FIG. 3 is a view of the support of FIG. 1 illustrating the ability to pivot the enclosure with respect to the frame in a first direction.
Figure 4:
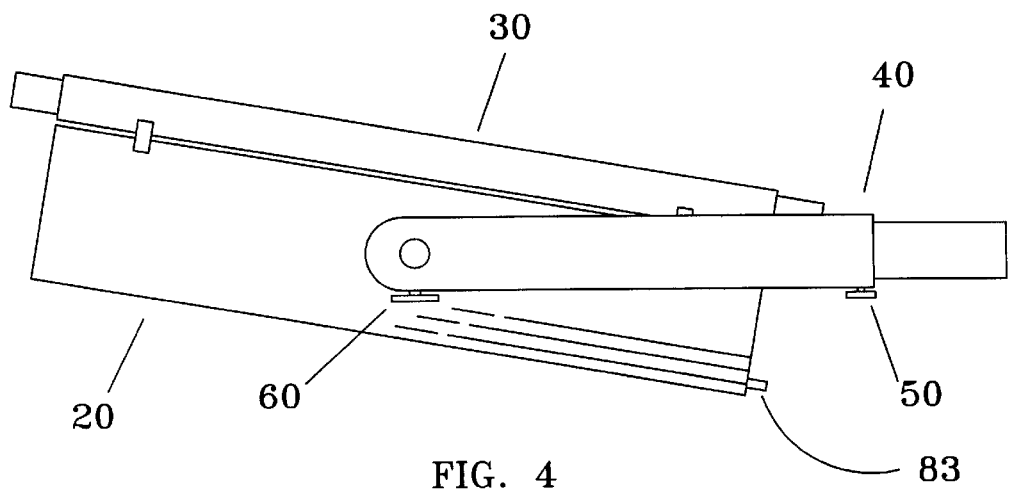
FIG. 4 is a view of the support of FIG. 1 illustrating the ability to pivot the enclosure with respect to the frame in a second direction.

The frame 40 provides a base 46 from which extend left and right forks 41, 42. As seen in FIGS. 5 and 6, an end portion 43, 44 of each of the left and right forks, respectively, supports the enclosure in a pivotable manner at opposed first and second middle points on opposite sides of the rounded body. Pivot posts 62, each having a round cross-section, extend from opposed sides of a middle portion of the enclosure and through holes defined in the forks having incrementally greater cross-sectional diameter. The enclosure is therefore able to pivot between horizontal, inclined and declined positions, as seen in FIGS. 1, 3 and 4, respectively.

The frame provides a support insert 47 which extends from the base in a direction opposite the forks. The support insert may be inserted into a receiver tube, thereby supporting the entire frame. Receiver tubes may be similar in structure to receiver tubes used by vehicles to mount the hitch needed to tow trailers. The receiver tube is typically located on a wall or supported by a rack in a work area, a cooling area, an oven or a mobile cart. The entire adjustable support 10 may therefore be easily moved between any areas by plugging the support insert into a receiver tube in the desired location.

Figure 8:
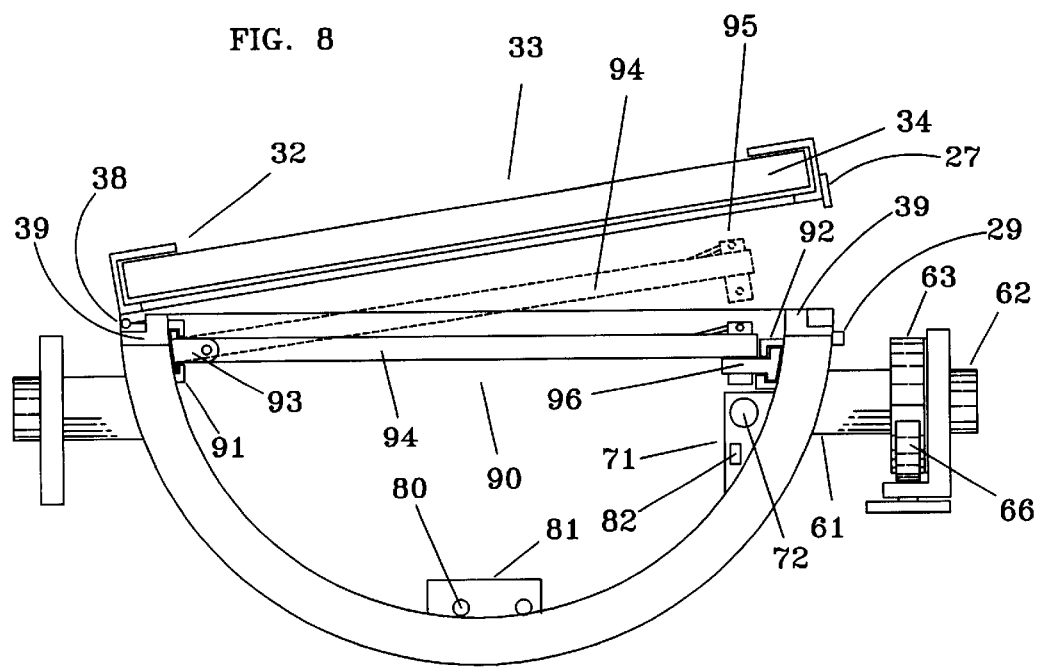
FIG. 8 is a cross-sectional view similar to that of FIG. 7, showing the cover in a somewhat open position and also showing the restraint assembly.

As seen in the detailed view of FIGS. 8 and 9, the preferred locking means includes a locking pivot 60, carried by at least one of the left and right forks, which allows the enclosure 20 to be fixed rigidly with respect to rotation about an axis defined between the end portions 43, 44 of the left and right forks. A stand-off 61 is typically square tubing, and is welded or similarly fastened to a middle point of the outside of the enclosure. A wheel 63 is carried by the stand-off 61 in a manner that prevents rotation between the two. Typically, the wheel defines a square hole, into which the stand-off extends. The pivot post 62 having a round cross-section may extend through the stand-off, 61, wheel 63 and through a hole defined in the end portion of one of the forks.

A bolt 65 is threaded through a hole defined in a flange 45 carried by one of the forks. A handle 64 carried by a first end of the bolt allows manual rotation of the bolt. A second end of the bolt is carried within a recess 67 within the brake 66. Rotation of the bolt in the clockwise direction forces the brake against the wheel, while rotation in the counter-clockwise direction releases the pressure. Where the brake is forced against the wheel, the support insert is unable to rotate with respect to the base of the frame.

Figure 7:
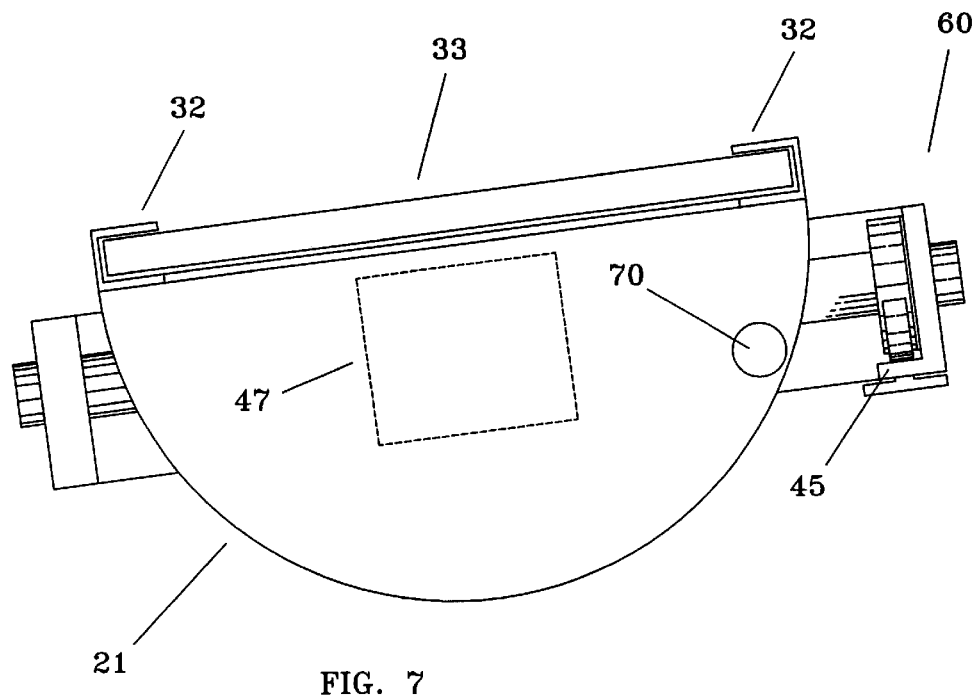
FIG. 7 is an orthographic end view, showing the locking pivot for controlling rotation about an axis perpendicular to the lengthwise axis, and showing how the enclosure and forks may be rotated about the lengthwise axis.

As seen by a comparison of FIGS. 7 and 8, the enclosure 20 may be pivoted about a lengthwise axis by allowing rotation by the base 46 with respect to the support insert 47. Rotation about such a lengthwise axis is controlled by a locking pivot 50 which is carried by the support insert 47 of the frame 40.

As seen in the detailed view of FIG. 10, the preferred locking pivot means 50, carried by the support insert, provides an end plate 51 which terminates the support insert. A round neck 52 extends from the end plate through a round hole defined in the base 46, thereby allowing rotation between the end plate and the base.

A square neck 53 extends from the round neck 52, and passes through a square hole defined in the center of the wheel 59. As a result of the connection between the square neck 53 and the wheel, rotation of the support insert 47 and associated end plate 51 results in rotation of the wheel 59.

A threaded end portion 54 extends from the square neck 53, and is secured by a locking nut 55 or similar fastener.

A frictional brake 58 is sized to engage the wheel 59 to prevent rotation by the base with respect to the support insert 47. When the handle 56 is rotated clockwise, the threaded shaft 57 urges the brake into contact with the wheel 59. When the shaft is retracted, the brake disengages and allows the support insert 47 to pivot with respect to the base 46 and frame 40.

As seen in FIGS. 7 and 8, a thermometer faceplate 70 is carried on the one of the half-round ends 22, 23 of the enclosure, or in any other suitable location. An element 72 is carried within the workpiece cavity 28 within a protective cage 71, allowing the temperature within the workpiece cavity to be measured.

A supplemental heating element 80 may be located in any desired location within the workpiece cavity, typically within a protective shroud 81. The supplemental heating element will replace heat energy lost as time passes, and will therefore slow the cooling process of the workpiece, allowing more time to be spent on the workpiece. The supplemental heating element may be electrical, gas or fueled by any alternative source, as desired. A gas or electrical fitting or plug 83 is typically located on the half-round rear end surface 23.

The supplemental heat source is typically regulated by a thermostat 82, which allows the selection and maintenance of a desired temperature.

As seen in FIG. 8, a restraint assembly 90 is carried by the enclosure and allows the workpiece to be secured within the enclosure. This is particularly important where the enclosure is to be pivoted about the lengthwise axis or about the axis between the end portions of the forks.

A preferred version of the restraint assembly 90 includes first and second tracks 91, 92 defined on an inside surface of the enclosure 20. The first track supports one or more sliding base supports 93, while the second track supports one or more sliding latch supports 96. The sliding base support(s) and sliding latch support(s) may be slid within the tracks 91, 92 in a lengthwise direction along the inside of the enclosure.

As seen particularly in FIG. 8, a first end of the arm 94 is pivotally carried by each sliding base support 93. The second end of the arm 94 is releasably attachable by a latch 95 to a sliding latch support 96. When the arm is locked, the workpiece is secured between the arm and the inside metal surface 24.

To use the adjustable support 10, the cover 30 is opened by pivoting along the hinge 38. The arms 94 of the restraint assembly are either opened or slid out of the way, and the preheated workpiece is placed on the metal inside surface 24 of the workpiece cavity 28. Arms 94 are then secured over the workpiece and fastened to sliding latch supports 96. The cover is then closed and the latch fastened. The locking pivot 50 may be loosened, allowing the enclosure to be pivoted about the lengthwise axis, and then retightened. The locking pivot 60 may be loosened, allowing the enclosure to be pivoted about the short axis between the end portions of the forks, and then re-tightened.

The first and second sliding doors 35, 36 may be slid within the U-shaped side elements 32 of the frame 31 of the cover 30, thereby forming a desired opening 37 between the sliding doors which allows easy access to the workpiece, but prevents undesirable heat loss which overheats the worker and results in premature cooling of the workpiece.

The previously described versions of the present invention have many advantages, including a primary advantage of providing a novel insulated workpiece support which prevents rapid heat transfer from the workpiece, thereby extending the period of time during which work may be performed and also reducing the heat exposure to the worker.

Another advantage of the present invention is to provide a novel insulated workpiece support which provides a structure allowing the worker to adjust the size and location of the opening through which work is performed.

A still further advantage of the present invention is to provide a novel insulated workpiece support which allows rotation about at least one axis of the enclosure supporting the workpiece to increase the ability of the welder to control the pooling of melted metal and to access certain parts of the workpiece.

Although the present invention has been described in considerable detail and with reference to certain preferred versions, other versions are possible. For example, while general dimensions of the preferred enclosure have been disclosed, alternate sizes and shapes could be manufactured to support any workpiece. For example, an adjustable workpiece support could have a square cross-section. Similarly, while preferred versions of the locking pivot assemblies 50, 60 have been disclosed, a number of alternative locking structures are known. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An adjustable support for containment of a workpiece for welding, the adjustable support comprising:
   (A) an enclosure defining a workpiece cavity, wherein wall portions of the enclosure have insulation means for preventing rapid heat transfer; and
   (B) a cover carried by the enclosure comprising a first frame carrying at least one independently movable sliding door sized so that when the at least one door is fully slid within the first frame, the cover fully covers the workpiece carried within the enclosure, but when the at least one door is partially slid from the first frame an opening is defined providing access to the workpiece cavity; and
   (C) a second frame, comprising:
      (a) left and right forks extending from a base, an end portion of each of the left and right forks supporting the enclosure at opposed first and second middle points, respectively; and
      (b) support insert means, extending from the base, for mounting the second frame.

2. The adjustable support for containment of a workpiece for welding of claim 1, further comprising locking pivot means, carried by at least one of the left and right forks, for allowing and preventing rotation by the enclosure with respect to an axis defined between the end portions of the left and right forks.

3. The adjustable support for containment of a workpiece for welding of claim 2, further comprising locking pivot means, carried by the support insert means, for allowing and preventing rotation by the base with respect to the support insert means.

4. The adjustable support for containment of a workpiece for welding of claim 3, further comprising restraint assembly means, carried by the enclosure, for encircling a portion of the workpiece cavity, the restraint assembly comprising:
   (a) opposed first and second tracks, defined on an inside surface of the enclosure;
   (b) a sliding base support and a sliding latch support sized for sliding travel within the first and second tracks, respectively; and
   (c) at least one arm pivotably carried by the sliding base support and releasably attachable to the sliding latch support.

5. The adjustable support for containment of a workpiece for welding of claim 1, further comprising locking pivot means, carried by the second frame, for allowing and preventing rotation by the enclosure with respect to an axis defined between an end portion of the left fork and an end portion of the right fork.

6. The adjustable support for containment of a workpiece for welding of claim 1, further comprising locking pivot means, carried by the support insert means, for allowing and preventing rotation by the base with respect to the support insert means.

7. The adjustable support for containment of a workpiece for welding of claim 1, further comprising restraint assembly means, carried by the enclosure, for encircling a portion of the workpiece cavity, the restraint assembly comprising:
   (a) opposed first and second tracks, defined on an inside surface of the enclosure;
   (b) a sliding base support and a sliding latch support sized for sliding travel within the first and second tracks, respectively; and
   (c) an arm pivotably carried by the sliding base support and releasably attachable to the sliding latch support.

8. An adjustable support for containment of a workpiece for welding, the adjustable support comprising:
   (A) an enclosure defining a workpiece cavity, wherein wall portions of the enclosure have insulation means for preventing rapid heat transfer;
   (B) a cover carried by the enclosure comprises a first frame carrying independently movable first and second sliding doors sized so that when both doors are fully slid within the first frame, the cover fully covers the workpiece carried within the enclosure, but when one or both doors are partially slid from the first frame an opening is defined providing access to the workpiece cavity;
   (C) a second frame comprising:
      (a) left and right forks extending from a base, an end portion of each of the left and right forks supporting the enclosure at opposed first and second middle points, respectively; and
      (b) support insert means, extending from the base, for mounting the second frame;
   (D) locking pivot means, carried by at least one of the left and right forks, for allowing and preventing rotation by the enclosure with respect to an axis defined between the end portions of the left and right forks;
   (E) locking pivot means, carried by the support insert means, for allowing and preventing rotation by the base with respect to the support insert means; and
   (F) restraint assembly means, carried by the enclosure, for encircling a portion of the workpiece cavity, the restraint assembly comprising:
      (a) opposed first and second tracks, defined on an inside surface of the enclosure;
      (b) a sliding base support and a sliding latch support sized for sliding travel within the first and second tracks, respectively; and
      (c) an arm pivotably carried by the sliding base support and releasably attachable to the sliding latch support.

* * * * *